United States Patent
Ikuta et al.

(10) Patent No.: US 9,162,349 B2
(45) Date of Patent: Oct. 20, 2015

(54) TORQUE LIMITER FOR A POWER TOOL

(75) Inventors: Hiroki Ikuta, Anjo (JP); Hikaru Sunabe, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 575 days.

(21) Appl. No.: 13/590,619

(22) Filed: Aug. 21, 2012

(65) Prior Publication Data

US 2013/0048330 A1 Feb. 28, 2013

(30) Foreign Application Priority Data

Aug. 25, 2011 (JP) ................... 2011-184189

(51) Int. Cl.
| | |
|---|---|
| *F16D 7/08* | (2006.01) |
| *F16D 7/06* | (2006.01) |
| *B25B 23/14* | (2006.01) |
| *B25D 16/00* | (2006.01) |

(52) U.S. Cl.
CPC ............ *B25B 23/141* (2013.01); *B25D 16/003* (2013.01); *B25D 2250/165* (2013.01)

(58) Field of Classification Search
CPC ........... B25B 23/141; F16D 7/08; F16D 7/06; B25F 5/001
USPC ........................... 173/216, 213, 217
See application file for complete search history.

(56) References Cited

FOREIGN PATENT DOCUMENTS

| | | | | |
|---|---|---|---|---|
| GB | 2069073 A | * | 8/1981 | ............. F16D 7/06 |
| JP | A-2007-326168 | | 12/2007 | |

OTHER PUBLICATIONS

Jan. 5, 2015 Office Action issued in Japanese Application No. 2011-184189.

* cited by examiner

*Primary Examiner* — Michelle Lopez
(74) *Attorney, Agent, or Firm* — Oliff PLC

(57) ABSTRACT

A grinder as a power tool has a torque limiter. The torque limiter includes a second bevel gear; a spindle; a flange to which the rotation of the second bevel gear is transmitted, and a plurality of balls which are disposed between the second bevel gear and the flange. The ball is positioned at a first region and the second bevel gear, the ball and the flange rotate integrally thereby the rotation is transmitted to the flange. In a state that a torque exerted on the spindle exceeding the predetermined threshold, a relative rotation between the second bevel gear and the flange is occurred and the ball moves from the first region to the second region while rolling by means of the relative rotation. Therefore, the transmission of the rotation from the second bevel gear to the flange is regulated, and the torque exerted on the spindle is regulated.

9 Claims, 7 Drawing Sheets

TORQUE LIMITER FOR A POWER TOOL

CROSS REFERENCE TO RELATED APPLICATION

The present application claims priority from Japanese Patent Application No. 2011-184189, filed on Aug. 25, 2011, the disclosure of which is incorporated herein by reference in its entirety.

FIELD OF THE INVENTION

The invention relates to a power tool including a torque limiter.

BACKGROUND OF THE INVENTION

Japanese non-examined Patent Application Publication No. 2007-326168 discloses a hammer drill having a torque limiter. The torque limiter is provided with an intermediation gear actuated by a driving gear; a driven flange including a plurality of fear cam portions; balls held in a plurality of holding holes formed on the intermediate gear with a predetermined interval in a circumferential direction; a pressing plate, and a disc spring pressing the pressing plate.

While the hammer drill is working, in a state that the torque exerted on a hammer bit is less than the predetermined threshold, the pressing plate presses the intermediate gear against the driven flange by means of a biasing force of the disc spring and the intermediate gear and the driven flange are rotated integrally, thereby a torque of the intermediate gear is transmitted to the driven flange. On the other hand, in a state that the torque exerted on the hammer bit exceeds the predetermined threshold, since the ball moves over the cam portion against the biasing force of the disc spring, the pressing plate is pushed and the pressing to the intermediate is cancelled, thereby a transmission of the torque from the intermediate gear to the driven flange is cancelled.

SUMMARY OF THE INVENTION

Problem to be Solved by the Invention

However, in the torque limiter disclosed in Japanese non-examined Patent Application Publication No. 2007-326168, the ball is held by means of the holding hole formed on the intermediate gear rotated by the driving gear. And while the hammer drill is actuating, a pushing force is exerted on the ball toward the center of the ball from the intermediation gear in the lateral direction. In case that the torque exceeding the predetermined threshold is exerted on the hammer bit, since the ball receives a high biasing force from the disc spring, the ball is pushed by the intermediation gear in the lateral direction and then the ball moves on the driven flange while sliding. As a result, due to a friction force between the ball and the driven flange, a smooth driving of the torque is disturbed.

An object of the invention is, in consideration of the above described problem, to provide an improved technique with respect to a torque limiter.

Means for Solving the Problem

Above-mentioned object is achieved by the claimed invention. According to a preferable aspect of a power tool of the invention, a power tool which is adapted to actuate a tool being attachable to the power tool is provided. The power tool comprises a motor and a torque limiter which is disposed between the motor and the tool. The torque limiter comprises: a driving rotational member; a driven rotational member including a rotational shaft, the driven rotational member to which a rotation of the driving rotational member is transmitted; and a plurality of roll members which is disposed between the driving rotational member and the driven rotational member. The torque limiter is adapted to regulate a transmission of the rotation from the driving rotational member to the driven rotational member in a state that a torque exerted on the rotational shaft exceeds the predetermined threshold. Each roll member is movable between a first region where the roll member is located to transmit the rotation to the driven rotational member and a second region where the roll member is located to regulate the transmission of the rotation to the driven rotational member. Further, the roll member transmits the rotation to the driven rotational member in a state that the roll member is located at the first region by rotating integrally with the driving rotational member and the driven rotational member in a circumferential direction of the rotational shaft. On the other hand, in a state that the torque exerted on the rotational shaft exceeds the predetermined threshold, the driving rotational member and the driven rotational member cause a relative rotation between the driving rotational member and the driven rotational member, and the roll member is moved from the first region to the second region while rolling caused by the relative rotation. And the transmission of the rotation to the driven rotational member is regulated in a state that the roll member is located at the second region. "The transmission of the rotation to the driven rotational member is regulated" of the invention preferably includes features that the rotation of the driving rotational member transmitted to the driven rotational member is reduced or interrupted, in comparison with a situation in which the roll member is positioned at the first region.

According to a the invention, the roll member moves from the first region to the second region while rolling by means of a relative rotation between the driving rotational member and the driven rotational member, therefore in comparison in case that the roll member moves while sliding against a friction force, a loss of the energy for driving is decreased. Namely, the power tool in which the torque limiter drives smoothly is provided. Further, the degradation of the roll member is reduced thereby lifetime of the torque limiter i.e. the power tool is extended.

According to a further preferable aspect of the power tool of the invention, the torque limiter includes a biasing member which biases the driving rotational member and the driven rotational member to be close to each other. The driving rotational member includes a first groove, a second groove which is deeper than the first groove and a driving incline groove which includes an incline surface inclining against a rotating surface of the driving rotational member, the first groove, the second groove and the driving incline groove being respectively contactable with the roll member, and wherein the first groove and the second groove are connected via the driving incline groove such that the first groove, the second groove and the driving incline groove are disposed in a continuous manner in a circumferential direction of the driving rotational member. Further, the driven rotational member includes a third groove corresponding to the first groove, a forth groove corresponding to the second groove and being deeper than the third groove and a driven incline groove which includes an incline surface inclining against a rotating surface of the driven rotational member, the third groove, the forth groove and the driven incline groove being respectively contactable with the roll member, and wherein the third groove and the forth groove are connected via the driven incline groove such that the third groove, the forth groove and the driven incline groove are disposed in a continuous manner in a circumferential direction of the driven rotational member. A first part defined by a predetermined part of the driving incline groove and a second part defined by a predetermined part of the driven incline groove provide the first region. The first groove, the second groove, a part except the first part of the driving incline groove and the third groove, the forth groove, a part except the second part of the driven incline groove provide the second region.

According to this aspect, since the roll member is positioned at the first region and the driving rotational member, the roll member and the driven rotational member are rotated integrally biased by the biasing spring, the rotation of the driving rotational member is transmitted to the driven rotational member. And in case that the roll member moves to the second region, the roll member moves from the driving incline groove to the driven incline groove while rolling. Accordingly, the torque limiter is driven smoothly by a simple composition which utilizes the first groove, the second groove and the driving incline groove on the driving rotational member, and the third groove, the forth groove, and the driven incline groove on the driven rotational member, and the biasing force of the biasing spring.

According to a further preferable aspect of the power tool of the invention, the biasing member always biases the driving rotational member and the driven rotational member to be close to each other.

According to this aspect, in a state that the transmission of the rotation to the driven rotational member is regulated, the roll member is contacted with the driving rotational member and the driven rotational member by the biasing force of the biasing spring. Therefore, the roll member moves on the second region while rolling steadily. Accordingly, the degradation of the roll member is reduced. Further, the tilting rotation of the driving rotation member and the driven rotational member are regulated by the biasing force of the biasing spring.

According to a further preferable aspect of the power tool of the invention, the torque limiter includes a cushion member which is disposed between the driving rotational member and the driven rotational member. A thickness of the cushion member is defined such that the cushion member contacts with one of the driving rotational member and the driven rotational member in a state that the roll member contacts with the first groove, and contacts with both of the driving rotational member and the driven rotational member in a state that the roll member contacts with the second groove.

According to this aspect, when the roll member moves from the first groove to the second groove, the cushion member absorbs the impact force occurred on the driving rotational member and the driven rotational member.

According to a further preferable aspect of the power tool of the invention, the second groove is disposed at a plurality areas which are located at regular intervals in the circumferential direction of the driving rotational member, said a plurality areas corresponding to said a plurality of roll members respectively. The cushion member includes a plurality of holding portions which hold said a plurality of roll members respectively such that said a plurality of roll members are held at regular intervals.

According to this aspect, the cushion member has a function for keeping the interval of a plurality of the roll members. Therefore, the number of the component utilized to the power tool is reduced. Further, the transmission of the rotation to the driven rotational member and the interruption of the transmission of the rotation are accurately switched by said a plurality of the roll members held in regular intervals.

According to a further preferable aspect of the power tool of the invention, the torque limiter includes a retainer which is disposed between the driving rotational member and the driven rotational member, the retainer retaining said a plurality of roll members such that said a plurality of roll members are located at regular intervals in a rotational direction of the rotational shaft.

According to this aspect, since the retainer holds said a plurality of the roll member in regular intervals, the transmission of the rotation to the driven rotational member and the interruption of the transmission of the rotation are accurately switched by said a plurality of the roll members held in regular intervals. Therefore, the torque limiter is worked smoothly.

According to a further preferable aspect of the power tool of the invention, the torque limier includes a biasing member which biases the driving rotational member and the roll member to be close to each other, and a thrust bearing which is disposed between the biasing member and the driven member. The driven rotational member includes a pressing member which presses the roll member against the driving rotational member by transmitting a biasing force of the biasing member exerted via the thrust bearing to the roll member, and a transmission member which transmits the rotation to the rotational shaft. The driving rotational member includes a first groove, a second groove which is deeper than the first groove and a connect groove which includes a cross surface crossing the a rotating surface of the driving rotational member, the first groove, the second groove and the connect groove being respectively contactable with the roll member, and wherein the first groove and the second groove are connected via the connect groove such that the first groove, the second groove and the connect groove are disposed in a continuous manner in a circumferential direction of the driving rotational member. A part of the connect groove provides the first region. Further, the first groove, the second groove and the other part of the part of the connect groove provide the second region.

According to this aspect, the driven rotational member includes the pressing member which presses the roll member against the driving rotational member by transmitting the biasing force of the biasing member exerted via the thrust bearing to the roll member, and the transmission member which transmits the rotation to the rotational shaft. Accordingly, when the rotation is transmitted via the transmission member, the driving rotational member and the pressing member rotate integrally, and when the transmission of the rotation to the driven rotational member is regulated, a relative rotation between the driving rotational member and the pressing member is occurred thereby the roll member moves from the first region to the second region while rolling. Therefore, the degradation of the roll member is reduced. The lifetime of the torque limiter i.e. the power tool is extended.

According to a further preferable aspect of the power tool of the invention, the torque limiter includes a cushion member which is disposed between the pressing member and the transmission member of the driven rotational member.

According to this aspect, when the roll member moves from the first groove to the second groove, the cushion member absorbs the impact force occurred on the pressing member and the transmission member.

According to a further preferable aspect of the power tool of the invention, a length of the second groove in a circumferential direction is defined such that the roll member is regulated to move on the second groove in the rotational direction.

Before the power tool starts to work or after the power tool drives, the roll member is positioned at the second groove. Meanwhile, in a state that a free movement of the roll member is allowed in the second groove, when the power tool starts or stops to work, an inadvertent torque is exerted on the rotational shaft. However, according to this aspect, since a length of the second groove in a circumferential direction is defined such that the roll member is regulated to move on the second groove in the rotational direction, when the power tool starts or stops to work, an inadvertent torque is not exerted on the rotational shaft, thereby the torque limiter is worked smoothly.

According to a further preferable aspect of the power tool of the invention, the driving rotational member includes a gear portion to which a rotational output of a rotational driving mechanism is transmitted. "A rotational driving mechanism" of the invention typically includes feature in which a component such as a motor and so on, which outputs a rotation preferably is included.

According to this aspect, the driving rotational member doubles with a gear to which the rotational output of the rotational driving mechanism is transmitted. Therefore, a number of the component utilized on the power tool is reduced.

According to the invention, an improved technique with respect to a torque limiter is provided.

Other objects, features and advantages of the invention will be readily understood after reading the following detailed description together with the accompanying drawings and the claims.

DESCRIPTION OF THE PREFERRED EMBODIMENTS

Each of the additional features and method steps disclosed above and below may be utilized separately or in conjunction with other features and method steps to provide and manufacture improved power tools and method for using such the power tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment)

A first embodiment of the invention will be explained with reference to FIG. 1 to FIG. 6. In this embodiment, the invention will be explained by applying to a grinder as one example of an power tool. The grinder is configured to perform a grinding operation, a sanding operation or a cutting operation against a workpiece by rotating a grinding disc such as a grinding tool or a sanding tool, or a cutting tool and so on.

Figure 1:
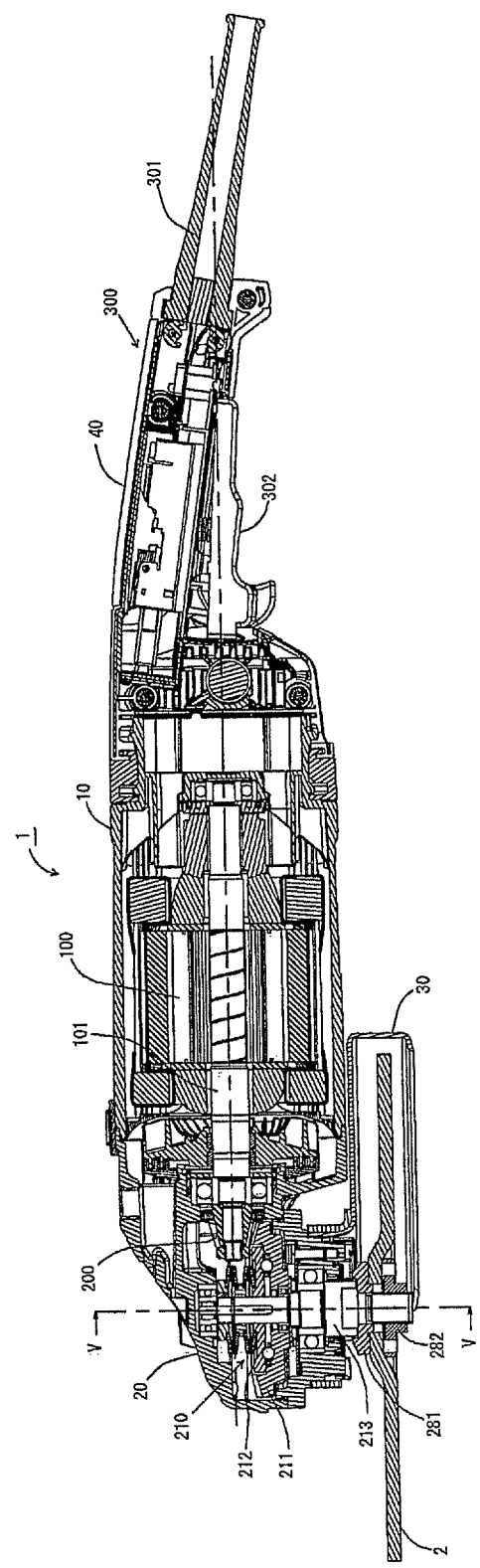
FIG. 1 shows a cross-sectional view of a total composition of a grinder in accordance with an embodiment of the invention.

As shown in FIG. 1, the grinder 1 is mainly provided with a main housing 10, a gear housing 20, a wheel cover 30 and a rear cover.

The main housing 10 is formed as a substantially cylindrical housing, which houses a motor 100. A rotational shaft 101 of the motor 100 is disposed so as to protrude toward the gear housing 20.

The gear housing 20 is arranged at one side of the main housing 10, and houses a first bevel gear 200, a torque limiter 210 and a rock member 270(refer to FIG. 5) and so on. The bevel gear 200 is disposed at a periphery of the rotational shaft 101 of the motor 100. The torque limiter 210 includes a spindle 213 to which a grinding disc 2 is attached. The rock member 270 is adapted to regulate a rotation of the spindle 213 when the grinding disc 2 is changed.

The wheel cover 30 is a substantially half-round shaped member which is attachable to an outside of the gear housing 20. The wheel cover 30 is adapted to surround a half periphery of the grinding disc 2 attached on the spindle 213 in a circumferential direction. The wheel cover 30 is adapted to regulate scatter of a workpiece grinded by the grinding disc 2 and to protect a user from the rotating grinding disc 2.

The rear cover 40 is arranged at opposite side of the main housing 10 opposed to the gear housing 20, and houses an electrical wiring portion 300. The electrical wiring portion 300 is provided with a power code 301 which provide current from an outside electrical power source, and a switch 302 which is switchable ON/OFF of the driving of the grinder 1. The electrical wiring portion 300 is electrically connected to the motor 100.

Figure 2:
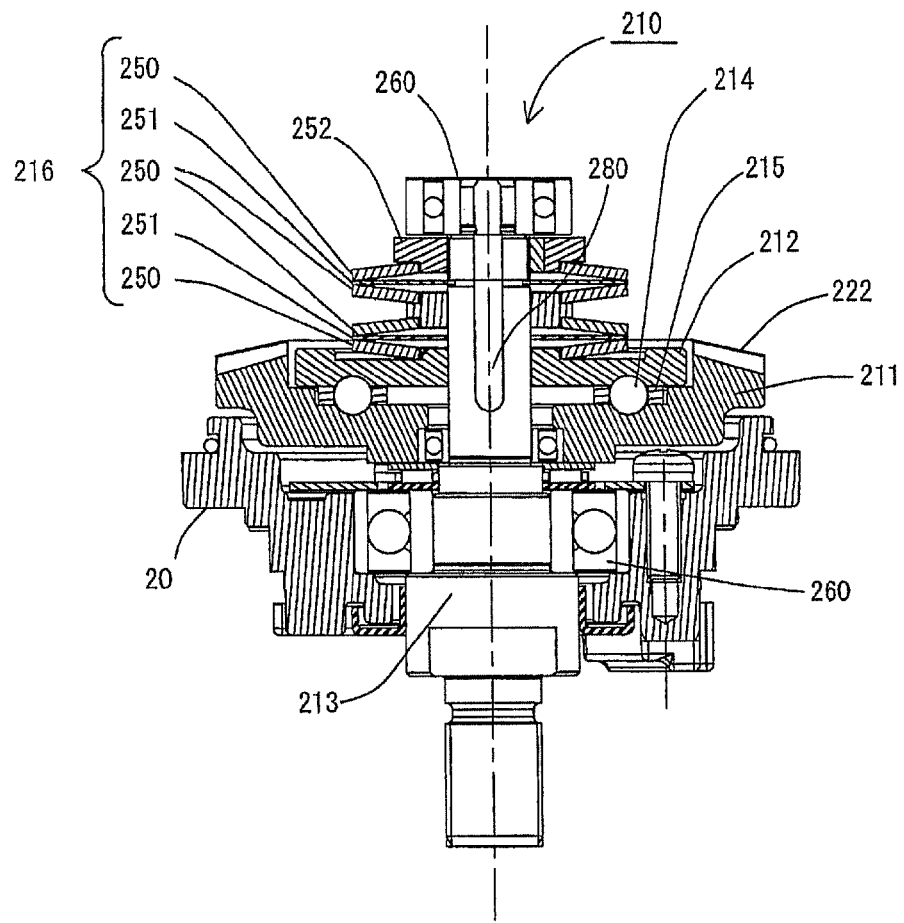
FIG. 2 shows a cross-sectional view of a torque limiter in accordance with a first embodiment of the invention.

The torque limiter 210 will be explained with reference to FIG. 2 to FIG. 4. As shown in FIG. 2, the torque limiter 210 is mainly provided with a second bevel gear 211, a flange 212, a spindle 213, balls 214, a ball retainer 215 and a biasing spring 216.

Figure 3:
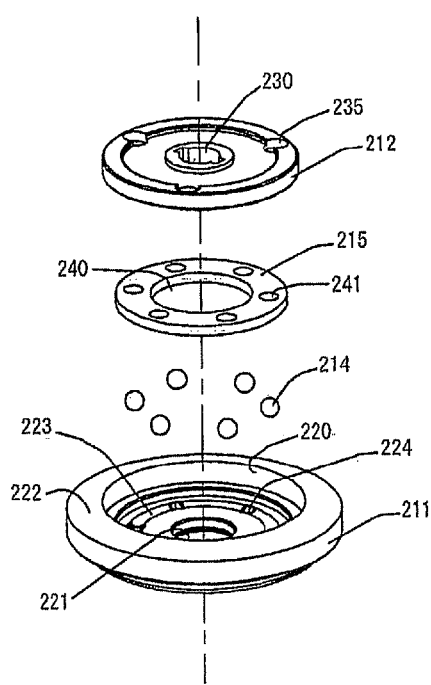
FIG. 3 shows an exploded perspective view of the torque limiter.

As shown in FIG. 2 and FIG. 3, the second bevel gear 211 is a substantially disk-shaped member made of metal, and includes a recess 220 is formed at a center part of the second bevel gear 211. A through-hole 221, into which the spindle 213 penetrates, is formed at the center of the recess 211. Further, gear teeth are formed at the periphery which is outside of the recess 220 thereby a gear portion 222 which is engaged with the first bevel gear 200 is provided by the gear teeth. The gear teeth of the gear portion 222 are not shown in FIG. 3 for convenience.

Figure 4:
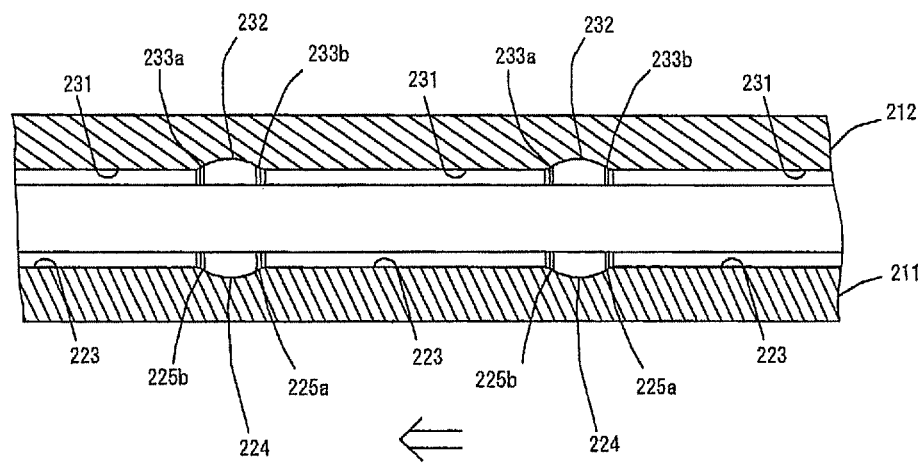
FIG. 4 shows a partial cross-sectional view of the torque limiter along a circumferential direction of a second bevel gear and a flange.

As shown in FIG. 3 and FIG. 4, a first cam groove 223 and a second cam groove are disposed at a bottom surface of the recess 220 so as to be connected via an incline groove 225a, 225b in a circumferential direction of the second bevel gear 211 and form a circle around the through-hole 221. The second cam grooves 224 are disposed at six parts of the recess 220 in the circumferential direction. The second cam groove 224 is deeper than the first cam groove 223, and a length of the second cam groove 224 in the circumferential direction is shorter than a length of the first cam groove 223. The incline groove 225 includes an incline surface which is inclined to the bottom surface of the recess 220. Namely, the incline groove 225 is provided so as to be inclined to a rotational surface of the second bevel gear 211. Further, an arrow in FIG. 4 indicates a rotational direction of the second bevel gear 211. The second bevel gear 211 is a feature corresponding to "a driving rotational member" of the invention. The first cam groove 223, the second cam groove 224 and the incline groove 225 are features corresponding to "a first groove", "a second groove" and "a driving incline groove" of the invention respectively.

The flange 212 is a disk-shaped member made of metal, and a through-hole 230 with which the spindle 213 engages is formed at a central part of the flange 212. A third cam groove 231 and a forth cam groove 232 are disposed on an opposite surface (lower surface in FIG. 4) of the flange 212 facing the second bevel gear 211, so as to be connected via an incline groove 233a, 233b in a circumferential direction of the flange 212, and form a circle around the through-hole 230. The forth cam grooves 232 are disposed at six parts of the flange 212 in the circumferential direction. The forth groove 232 is deeper than the third groove 231. In this way, a diameter of the circle defined by the third cam groove 231, the forth cam groove 232 and the incline groove 233 corresponds to a diameter of the circle defined by the first cam groove 223, the second cam groove 224 and the incline groove 225 disposed on the second bevel gear 221. The incline groove 233 includes an incline surface which is inclined to a surface of the flange 212. Namely, the incline groove 225 is provided so as to be inclined to a rotational surface of the flange 212. An angle between the incline surface of the incline groove 233 and the rotational surface of the flange 212 is defined as a same angle value as an angle between the incline surface of the incline groove 225 of the second bevel gear 211 and the rotational surface of the second bevel gear 211. The third cam groove 231, the forth cam groove 232 and the incline groove 233 are features corresponding to "a third groove", "a forth groove" and "a driven incline groove" of the invention respectively. Further, sections of the second bevel gear 211 and the flange 211 are shown in FIG. 4, for convenience the ball 214 and the ball retainer 215 and so on and the other element are omitted.

The spindle 213 is formed as a substantially cylindrical shape, and includes an engaging groove 280 with which an engaging pin 234 engages, in a state that the engaging pin 234 is inserted to the through-hole 230. The spindle 213 comes together with the flange 212 while the engaging pin 234 and the engaging groove 280 engage with each other (refer to FIG. 5). The spindle 213 is a feature corresponding to "a rotational shaft" of the invention. The flange 212 which is come together with the spindle 213 is a feature corresponding to "a driven rotational member" of the invention.

The ball 214 is made of metal, and six balls are disposed corresponding to the second cam groove 224. The ball retainer 215 is a disc-shaped member which is made of resin, a through-hole 240 to which the spindle 213 is inserted is disposed at the central part of the ball retainer 215. Six ball holding holes 241 which hold each ball 214 are disposed at regular intervals around the through-hole 240 in the circumferential direction of the ball retainer 215. This six ball holding holes 241 are disposed as same intervals as the second cam groove 224. The ball 214 is a feature corresponding to "a roll member" of the invention, the ball retainer 215 is a feature corresponding to "a retainer" of the invention. Further, the ball holding hole 241 is a feature corresponding to "a holding portion" of the invention.

The biasing spring 216 is provided with two pairs of disc springs 250 and a plain washer 251. The plain washer 251 is disposed between each pair of disc springs 250, each disc springs 250 of the same pair of disc springs 250 is disposed so as to oppose to each other. Number of the pair of disc springs 250 is optionally changeable based on a necessity of amount of biasing force. The biasing spring 216 is a feature corresponding to "a biasing member" of the invention.

As shown in FIG. 2, the second bevel gear 211, the flange 212, the spindle 213, the ball 214, the ball retainer 215 and the biasing spring 216 are assembled and composed the torque limiter 210. The second bevel gear 211 and the ball retainer 215 are assembled to be relatively rotatable to the spindle 213. On the other hand, the flange 212 and the biasing spring 216 are assembled to be rotated integrally with the spindle 213. The ball 214 is movable along the first cam groove 223, the second cam groove 224 and the incline groove 225 of the second bevel gear 211, as well as the third groove 231, the forth groove 232 and the incline groove 233 of the flange 212. A nut 252 is screwed with a distal part of the spindle 213, the biasing force of the biasing spring 216 is adjustable by a position of the nut 252. The biasing force biases the flange 212 and the second bevel gear 211 to be close to each other.

As shown in FIG. 1 and FIG. 2, the torque limiter 210 is held by the gear housing 20 via two ball bearings 260 such that a one end of the spindle 213 is protruded from the gear housing 20. Therefore the torque limiter 210 is disposed in the gear housing 20 in which a longitudinal direction of the spindle 213 and the rotational shaft 101 of the motor 100 perpendicularly cross to each other.

As shown in FIG. 1, an inner flange 281 and an outer flange 282 are disposed at a tip part of the spindle 213. The outer flange 282 is screwed with the spindle 213 thereby the inner flange 281 and the outer flange 282 clamp the grinding disk 2.

The torque limiter 210 is disposed to the grinder 1 described above, the first cam groove 223, the second cam groove 224 and the incline groove 225 are disposed at an opposite side from the grinding disk 2 in the longitudinal direction of the spindle 213 with respect to the second bevel gear 211. Similarly, the gear portion 222 is also disposed at the opposite side from the grinding disk 2 with respect to the second bevel gear 211.

Figure 5:
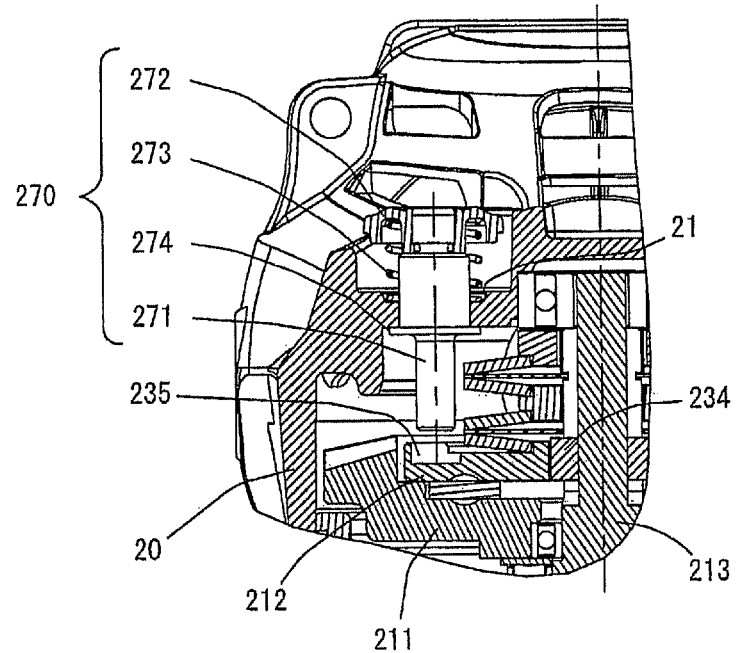
FIG. 5 shows a cross-sectional view taken from line V-V of FIG. 1.

A locking member 270 will be explained with reference to FIG. 5. The locking member 270 is provided with a locking pin 271, a press cap 272 and a coil spring 273. The locking pin 271 is disposed to be parallel to the longitudinal direction of the spindle 213 and to penetrate the gear housing 20. A flange 274 is disposed on the locking pin 271. The flange 274 prevents the locking pin 271 from dropping off toward out of the gear housing 20. A tip of one side of the locking pin 271 is adapted to engage with the engaging recess 235 arranged on the flange 212 of the torque limiter 210.

The press cap 272 is arranged at a tip of the other side of the locking pin 271 outside of the gear housing 20. The coil spring 273 is disposed around a periphery of the locking pin 271 outside of the gear housing 20 such that one end of the coil spring 273 engages with the press cap 272 and the other end of the coil spring 273 engages with the coil spring engaging portion 21 arranged as a concavity on an outside surface of the gear housing 20.

The locking member 270 described above is biased outward the gear housing 20 by the biasing force of the coil spring 273. On the other hand, the flange 274 prevents the locking member 270 from dropping off by contacting with the gear housing 20. The tip of the locking pin 271 is usually positioned distantly from the engaging recess 235 of the flange 212.

When the press cap 272 is pressed against the biasing force of the coil spring 273, the locking pin 271 is moved to be close to the flange 212 and then the tip of the locking pin 271 is engaged with the engaging recess 235. As a result, the motion of the flange 212 in the circumferential direction of the flange 212 is regulated. Namely, when a user changes the grinding disk 2, the spindle 213 is prevented from rotating.

The grinder 1 having a composition described above, an electric power is provided to the motor 100 from the outside electrical power source via the electrical wiring portion 300 by being operated the switch 302. Therefore, the motor 100 drives rotationally and the first bevel gear 200 arranged on the rotational shaft 101 rotates. A rotational output of the motor 100 is changed into a rotation around the spindle 213 by rotating the first bevel gear 200 and the second bevel gear 211 mated with each other, the grinding disk 2 attached on the spindle 213 is rotated. A workpiece is worked by pressing the rotating grinding disk 2 onto the workpiece.

Figure 6:
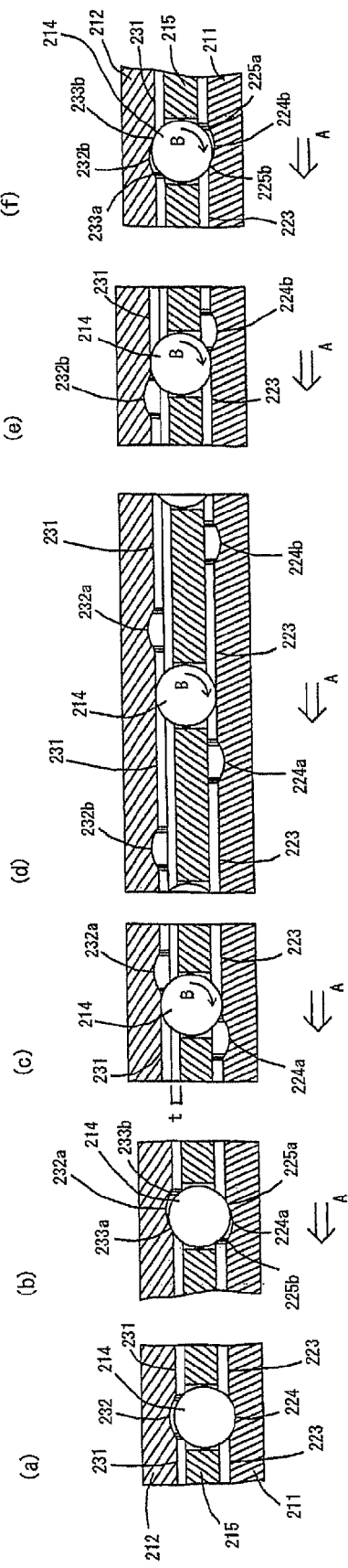
FIG. 6 shows partial cross-sectional views along the circumferential direction, which indicate a motion of the torque limiter.

A motion of the torque limiter 210 will be explained with reference to FIG. 6. Further, the second bevel gear 211, the flange 212, the ball 214 and the ball retainer 215 of the torque limiter 210 are only shown in FIG. 6, the other elements such like the biasing spring 216 and so on are not shown for convenience. Further, only one ball 214 is utilized for the explanation, however the motion of the other balls 214 is same. An arrow A in the FIG. 6(b) to FIG. 6(f) shows a rotational direction of the second bevel gear 211. An arrow B in the FIG. 6(c) to FIG. 6(f) shows a rotational direction of the ball 214.

FIG. 6(a) shows one situation of the torque limiter 210 when the grinder 1 is not working. In FIG. 6(a), the ball 214 contacts with the second cam groove 224a and the ball retainer 215 contacts with both of the second bevel gear 211 and the flange 212. Namely, a thickness of the ball retainer 215 is defined such that the ball retainer 215 contacts with both of the second bevel gear 211 and the flange 212, when the ball contacts with the second cam groove 224 during the non-working time of the grinder 1. Therefore, when the ball 214 contacts with the second cam groove 224, an top of the ball 214 does not contacts with the forth cam groove 232a. Further, a length of the second cam groove 224 is defined such that the second cam groove 224 regulates a free movement of the ball 214 in the rotational direction of the second bevel gear 224, when the grinder 1 is not working.

FIG. 6(b) shows another situation of the torque limiter 210, when the rotational output of the motor 100 is transmitted to the spindle 213. The rotational output of the motor 100 is transmitted to the second bevel gear 211 thereby the second bevel gear 211 rotates in a direction indicated by the arrow A. Due to the rotation of the second bevel gear 211, the ball 214 moves to a predetermined position where the ball 214 contacts with the incline groove 225a of the second bevel gear 211 and the incline groove 233a of the flange 212 disposed to be parallel to each other. And then, the second bevel gear 211, the ball 214 and the flange 212 rotate in an integral manner, thereby the rotation of the second bevel gear 211 is transmitted to the spindle 213. Since the grinding disk 2 attached on the spindle 213 is rotated, a workpiece is worked. The part of the incline groove 225a, 233a with which the ball 214 contacts are features respectively corresponding to "a first region" of the invention.

FIG. 6(c) shows another situation of the torque limiter 210, a transmission of rotation from the second bevel gear 211 to the flange 212 is regulated when a torque exceeding a predetermined threshold torque exerts on the spindle 213. For example, when the grinding disk 2 bits a workpiece during the operation in the torque limiter 210 shown in FIG. 6(b), a rotation of the grinding disk 2 is regulated. In accordance with the regulation of the transmission of the rotation, the spindle 213 on which the grinding disk 2 is attached and the flange 212 with which the spindle 213 is engaged are also stopped rotating. On the other hand, because the motor 100 keeps rotating, the rotational output of the motor 100 is transmitted to the second bevel gear 211. If the rotation of the second bevel gear 211 is transmitted to the flange 212, the torque exceeding to the predetermined threshold torque may exert on the spindle 213 arranged between the grinding disk 2 regulated to rotate and the flange 212.

However in this embodiment, a relative rotation between the second bevel gear 211 and the flange 212 is occurred because the flange is stopped rotating even though the second bevel gear 211 keeps rotating. A rotate power on the ball 214 clamped between the second bevel gear 211 and the flange 212 is occurred due to the relative rotation. When the sum total of a component of the rotate power of the six balls 214 in a direction being parallel to the spindle 213 exceeds the biasing force of the biasing spring 216, the ball 214 contacting with the inclined grooves 225a, 233a rotates while pushing the flange 212, and moves to the position where the ball 214 contacts with the first cam groove 223 and the third cam groove 231. In this way, because the ball 214 is positioned on the first cam groove 223 which is parallel to the rotational surface of the second bevel gear 211, the transmission of the rotation from the second bevel gear 211 to the flange 212 is regulated thereby the torque exerted on the spindle 213 is reduced. Further, when the ball 214 is positioned such that the ball 214 contacts with the first cam groove 223 and the third cam groove 231, a gap t exists between the flange 212 and the ball retainer 215.

Each FIG. 6(d) and FIG. 6(e) shows another situation of the torque limiter 210 respectively after the ball 214 has moved to the position where the ball 214 contacts with the first cam groove 223 and the third cam groove 231. Because of the relative rotation of the second bevel gear 211 and the flange 212, the ball 214 moves toward another second cam groove 224b which is located next to the second cam groove 224a in the circumferential direction while the ball 214 is rolling. Meanwhile, on the flange 212, the ball 214 moves toward another forth groove 232b which is located next to the forth cam groove 232a in the circumferential direction. In each FIG. 6(c) to FIG. (e), the biasing force of the biasing spring 216 is transmitted to the second bevel gear 211 from the flange 212 via the ball 214. Namely, the biasing spring 216 always biases the second bevel gear 211 and the flange 212 so as to be close to each other.

FIG. 6(f) shows another situation of the torque limiter 210 in which the ball 214 contacts with the incline groove 225b, 233b respectively, when the ball 214 moves from the first cam groove 223 and the third cam groove 231 to the second cam groove 224b and the forth cam groove 232b respectively. On the way of the ball 214 to the second cam groove 224b and the forth cam groove 232b, the flange 212 biased by the biasing spring 216 moves such that the gap t becomes smaller and the flange 212 is close to the second bevel gear 211, thereby the flange 212 contacts with the ball retainer 215. After that, the torque limiter 210 returns to the situation shown by FIG. 6(b) in which the ball 214 contacts with the incline groove 225a, 233a by passing the second cam groove 224b, and then the similar cyclic behavior of the torque limiter 210 will be repeated.

The rotation of the second bevel gear 211 is not transmitted to the flange 212 in FIG. 6(c) to FIG. 6(f) respectively. Under these situations, the first cam groove 223, the second cam groove 224 and the incline groove 225b of the second bevel gear 221, and the third cam groove 231, the forth cam groove 232 and the incline groove 233b of the flange 211 in which these grooves contacts with the ball 214 respectively, is a feature corresponding to "a second region" of the invention.

According to the first embodiment described above, because the ball 214 moves while rolling due to the relative rotation of the second bevel gear 211 and the flange 212, the ball 214 can move smoothly. Therefore, the torque limiter 210 works smoothly. Further, in comparison with a composition in which the ball 214 moves while sliding against the friction force, the degradation or the heat generation of the ball 214 by the friction force is reduced.

Further, according to the first embodiment, because the ball 214 is biased by the biasing spring 216 while the ball 214 is contacting with the incline groove 255a, 233a, the second bevel gear 211, the flange 212 and the ball 214 rotate integrally. Accordingly, a simple construction in which grooves are formed on the second bevel gear 211 and the flange 212 achieves that the torque limiter 210 works smoothly.

Further, according to the first embodiment, the biasing spring 216 always biases the second bevel gear 211 and the flange 212 so as to be close to each other. Therefore, when the rotation of the second bevel gear 211 is not transmitted to the flange 212, the second bevel gear 211 is regulated to rotate while tilting against the spindle 213.

Further, according to the first embodiment, the ball retainer 215 includes the ball holding hole 241 which holds the balls 214, therefore the balls 214 are held in a same interval as the interval of the second cam groove 224 and the forth cam groove 232. Namely, the ball retainer 215 has a function for keeping the interval of the balls 214.

Further, in a state that the ball retainer 215 is not provided to the torque limiter 210, when the ball 214 moves from the first cam groove 223 and the third cam groove 231 to the second cam groove 224 and the forth cam groove 232 respectively, because the second bevel gear 211 and the flange 212 move to be close to each other, both of the second bevel gear 211 and the flange 212 crash into the ball 214. Accordingly, due to a crash of members made of metal, when the torque limiter 210 is working, a noise or a metal fatigue is occurred. However, in this embodiment, in a state that the ball is positioned on the second cam groove 224, the ball retainer 215 contacts with both of the second bevel gear 211 and the flange 212. Therefore, when the ball 214 moves from the first cam groove 223 and the third cam groove 231 to the second cam groove 224 and the forth cam groove 232 respectively, the second bevel gear 211 and the flange 212 are regulated to crash into the ball 214. Further, an outside edge part of the flange 211 is regulated to crash into the second bevel gear 211 directly. Further, because the ball retainer 215 is made of resin, an impact power generated when the second bevel gear 211 and the flange 212 made of metal respectively crash into the ball retainer 215 is absorbed. Namely, the ball retainer 215 has a function as a cushion member. Accordingly, the ball retainer 215 is a feature corresponding to "a cushion member" of the invention.

Further, according to the first embodiment, the length of the second cam groove 224 in the circumferential direction is defined such that the second cam groove 224 regulates the free movement of the ball 214 in the rotational direction of the second bevel gear 211, when the grinder 1 is not working. In case that the free movement of the ball 214 in the rotational direction of the second bevel gear 211 may not be regulated, when the grinder 1 starts or stops driving, a rotation differences between the second bevel gear 211 and the flange 212 may be occurred by the movement of the ball 214. Due to the rotation differences, an inadvertent torque may be exerted on the spindle 213 or a failure of the driving of the torque limiter 210 may be occurred when the grinder 1 starts or stops driving. However, according to this embodiment, because the length of the second cam groove 224 is defined such that the second cam groove 224 regulates the free movement of the ball 214 in the rotational direction of the second bevel gear 211 when the grinder is not working, the inadvertent torque is not exerted and the failure of the driving of the torque limiter 210 is not occurred.

Further, according to the first embodiment, the first cam groove 223, the second cam groove 224 and the incline groove 225 are disposed on the surface of the second bevel gear 211 opposed from the side where the grinding disk 2 is attached. Therefore, components of the torque limiter 210 such as the flange 212, the ball 214 and the ball retainer 215 and so on, which are disposed to oppose to the first cam groove 223, the second cam groove 224 and the incline groove 225, are disposed on the surface opposed to the side where the grinding disk 2 is attached with respect to the second bevel gear 211. Therefore, a length of a part of the spindle 213 protruding in a direction from the second bevel gear 211 toward the grinding disk 2 attached portion is shortened, thereby the grinder 1 is downsized. Furthermore, since the gear teeth are formed on the edge part of the second bevel gear 211, the recess 220 is formed at a central part of the second bevel gear 211. By arranging components of the torque limiter 210 such as the flange 212, the ball 214, the ball retainer 215 and so on at the recess 220, each components are rationally arranged, thereby the torque limiter 210 is downsized. As a result, the grinder 1 is downsized.

Further, according to the first embodiment, the gear portion 222 is formed at an opposite side from a side to which the grinding disk 2 is attached with respect to the longitudinal direction of the spindle 213. Therefore, a length of the spindle 213 protruding from the second bevel gear 211 is shortened, and as a result, the grinder 1 is downsized. Further, since the gear portion 222, the first cam groove 223, the second cam groove 224 and the incline groove 225 are respectively arranged on the opposite side of the second bevel gear 211 from where the grinding disk 2 is attached, the components of the torque limiter 210 is rationally arranged. Therefore, the grinder 1 is further downsized.

Further, in the first embodiment, the ball holding holes 241 which keep an interval of the balls 214 is formed on the ball retainer 215, and the ball retainer 215 has functions as an interval keeping member and a cushion member, however it is not limited to this composition. The ball retainer may have only function as the interval keeping member, and other cushion member may be provided than the ball retainer 215.

(Second Embodiment)

A second embodiment will be explained with reference to FIG. 7 to FIG. 11. However, same components as the first embodiment are signed same numeral and omitted from the explanation for convenience.

Figure 7:
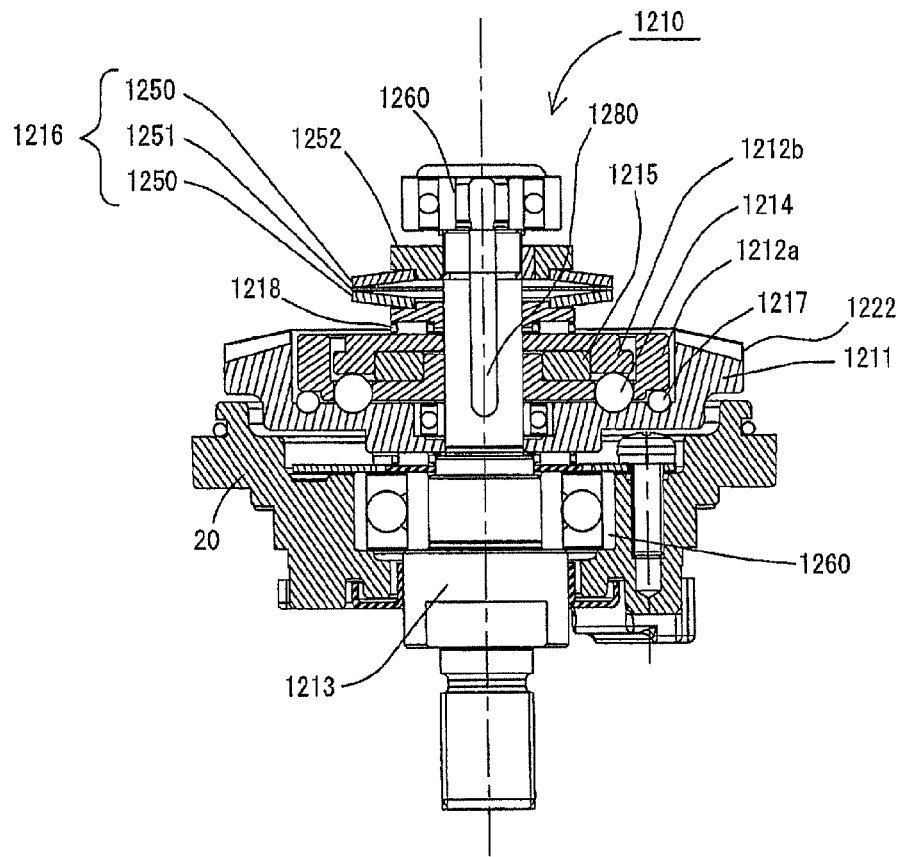
FIG. 7 shows a cross-sectional view of a torque limiter in accordance with a second embodiment of the invention.

FIG. 7 shows a torque limiter 1210 according to the second embodiment of the invention. Other components of the grinder 1 than the torque limiter 1210 are similar to the first embodiment. The torque limiter 1210 is mainly provided with a second bevel gear 1211, a rotation transmission member 1212a, a pressing force transmission member 1212b, a spindle 1213, balls 1214, a cushion member 1215, a biasing spring 1216, supporting balls 1217 and a thrust bearing 1218.

Figure 8:
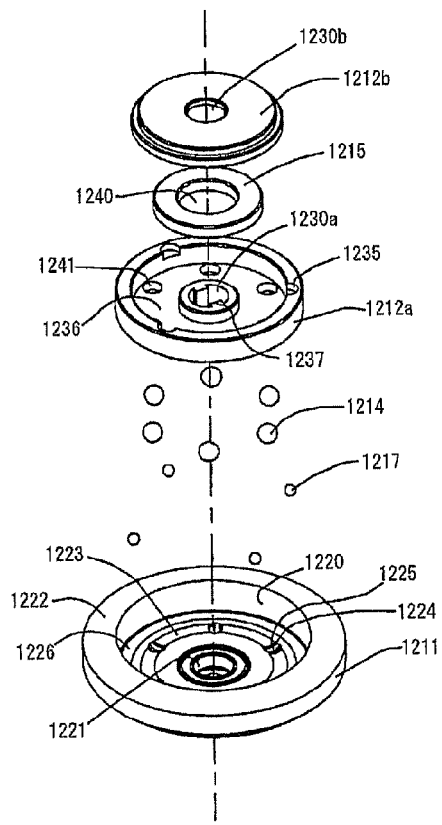
FIG. 8 shows an exploded perspective view of the torque limiter.

As shown in FIG. 7 and FIG. 8, the second bevel gear 1211 is similar to the second bevel gear 211 of the first embodiment, namely a through-hole 1221, a first cam groove 1223, a second cam groove 1224 and an incline groove 1225 are disposed annularly at a bottom surface of a recess. Further, a supporting groove 1226 in which the supporting balls 1217 are movable is at an outside of the annular groove. A gear portion 1222 including gear teeth is disposed at an outside of the recess 1220. Further, the gear teeth are not shown in FIG. 8.

Figure 9:
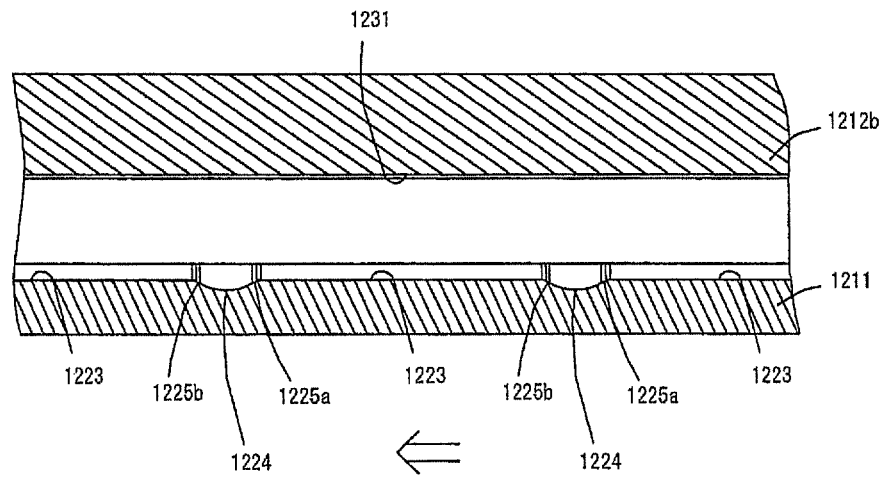
FIG. 9 shows a partial cross-sectional view of the torque limiter along a circumferential direction of a second bevel gear and a flange.

As shown in FIG. 9, the first cam groove 1223 and the second cam groove 1224 are connected via the incline groove 1225 in the circumferential direction. Further, an arrow in FIG. 9 indicates a rotational direction of the second bevel gear 1211. Cross sections of the second bevel gear 1211 and the pressing force transmission member 1212b are shown in FIG. 9 for convenience, the other elements such as the rotation transmission member 1212a, balls 1214 and so on are not shown in FIG. 9. The second bevel gear 1212 is a feature corresponding to "a driving rotational member" of the invention. The first cam groove 1223, the second cam groove 1224 and the incline groove 1225 are features respectively corresponding to "a first groove", "a second groove" and "a connect groove" of the invention.

As shown in FIG. 7 and FIG. 8, the rotation transmission member 1212a and the pressing force transmission member 1212b are respectively disk-shaped members made of metal, of which through-holes 1230a, 1230b to which the spindle 1213 is inserted are respectively disposed at the center part. The cushion member 1215 is a disk-shaped member made of resin, of which a through-hole 1240 to which the spindle 1213 is inserted is disposed at the center part. The cushion member 1215 is a feature corresponding to "a cushion member" of the invention.

A cushion member holding portion 1236 is provided around the through-hole 1230a of the rotation transmission member 1212a. Engaging recesses 1235 which engage with the locking pin (refer to FIG. 10) are disposed at three part of the periphery of the rotation transmission member 1212a. Ball holding holes 1241 which correspond to the size of the ball 1214 are disposed at six part of the cushion member holding portion 1236. A third cam groove 1231 is disposed on a surface (lower surface in FIG. 9) of the pressing force transmission member 1212b which faces the second bevel gear 1211 in the circumferential direction. In the second embodiment, only the third cam groove 1231 is disposed on the pressing transmission member 1212b, i.e. the incline groove is not disposed. Further, the rotation transmission member 1211a is a feature corresponding to "a transmission member" of the invention. The pressing force transmission member 1212b is a feature corresponding to "a pressing member" of the invention.

The spindle 1213 is formed as a substantially cylindrical shape, and includes an engaging groove 1280 with which an engaging protrusion 1237 of the through-hole 1230a engages, in a state that the spindle 1213 is inserted to the through-hole 1230a, 1240, 1230b. The spindle 1213 is a feature corresponding to "a rotational shaft" of the invention. The rotation transmission member 1212a and the pressing force transmission member 1212b which are incorporated with the spindle 1213 are a feature corresponding to "a driven rotational member" of the invention.

The ball 1214 is made of metal, and six balls are disposed corresponding to the second cam groove 1224. Further, the supporting ball 1217 is made of metal, and four balls are disposed in the supporting groove 1226. The ball 1214 is a feature corresponding to "a roll member" of the invention.

The biasing spring 1216 is provided with a pair of disc springs 1250 and a plain washer 1251. The plain washer 1251 is disposed between the pair of disc springs 1250, the disc springs 1250 are disposed so as to oppose to each other. In the first embodiment, two pairs of the disc springs 250 are provided, however in the second embodiment, one pair of the disc springs 1250 is provided. Further, number of the pair of disc springs 1250 is optionally changeable based on a necessity of amount of biasing force. The biasing spring 1216 is a feature corresponding to "a biasing member" of the invention.

As shown in FIG. 7, the second bevel gear 1211, the rotation transmission member 1212a, the pressing force transmission member 1212b, the spindle 1213, the ball 1214, the cushion member 1215, the biasing spring 1216, the supporting ball 1217 and the thrust bearing 1218 are assembled and composed the torque limiter 1210. The second bevel gear 1211, the pressing force transmission member 1212b, the cushion member 1215, the biasing spring 1216 and the thrust bearing 1218 are assembled to be relatively rotatable to the spindle 1213. On the other hand, the rotation transmission member 1212a is assembled to be rotated integrally with the spindle 1213. The ball 1214 is movable along the first cam groove 1223, the second cam groove 1224 and the incline groove 1225 of the second bevel gear 1211. The supporting ball 1217 is movable along the supporting groove 1226 of the second bevel gear 1211.

A nut 1252 is screwed with a distal part of the spindle 1213, the biasing force of the biasing spring 1216 is adjustable by a position of the nut 1252. The biasing force is transmitted to the pressing force transmission member 1212b via the thrust bearing 1218, and biases the pressing force transmission member 1212b and the second bevel gear 211 to be close to each other.

The supporting ball 1217 supports the periphery of the rotation transmission member 1212a. Therefore, the supporting ball 1217 keeps a predetermined gap between the rotation transmission member 1212a and the second bevel gear 1211, and regulates the rotation transmission member 1212a to tilt against the spindle 1213. Four supporting balls 1217 are provided in this embodiment, however more than three balls may be provided to make a plane.

Figure 10:
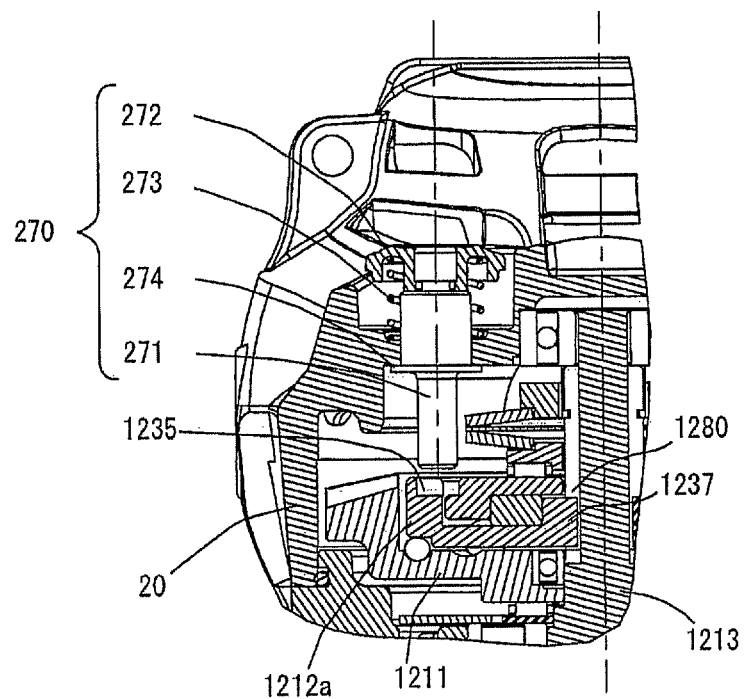
FIG. 10 shows a cross-sectional view of the second embodiment of the invention, which is corresponds to FIG. 5.

The locking member 270 will be explained with reference to FIG. 10. As shown in FIG. 10, a tip of the locking pin 271 is usually positioned distantly form the engaging recess 1235 of the rotation transmission member 1212a. When the press cap 272 is pressed against the biasing force of the coil spring 273, the locking pin 271 is moved to be close to the rotation transmission member 1212a and then the tip of the locking pin 271 is engaged with the engaging recess 1235. As a result, the motion of the rotation transmission member 1212a in the circumferential direction of the rotation transmission member 1212a is regulated. Namely, when a user changes the grinding disk 2, the spindle 1213 is prevented from rotating.

A motion of the torque limiter 1210 will be explained with reference to FIG. 11. Further, the second bevel gear 1211, the rotation transmission member 1212a, the pressing force transmission member 1212b and the ball 1214 of the torque limiter 1210 are only shown in FIG. 11, the other elements such like the biasing spring 1216 and so on are not shown for convenience. Further, only one ball 1214 is utilized for the explanation, however the motion of the other balls 1214 is same. An arrow A in the FIG. 11(*b*) to FIG. 11(*f*) shows a rotational direction of the second bevel gear 1211. An arrow B in the FIG. 11(*c*) to FIG. 11(*f*) shows a rotational direction of the ball 1214.

Figure 11:
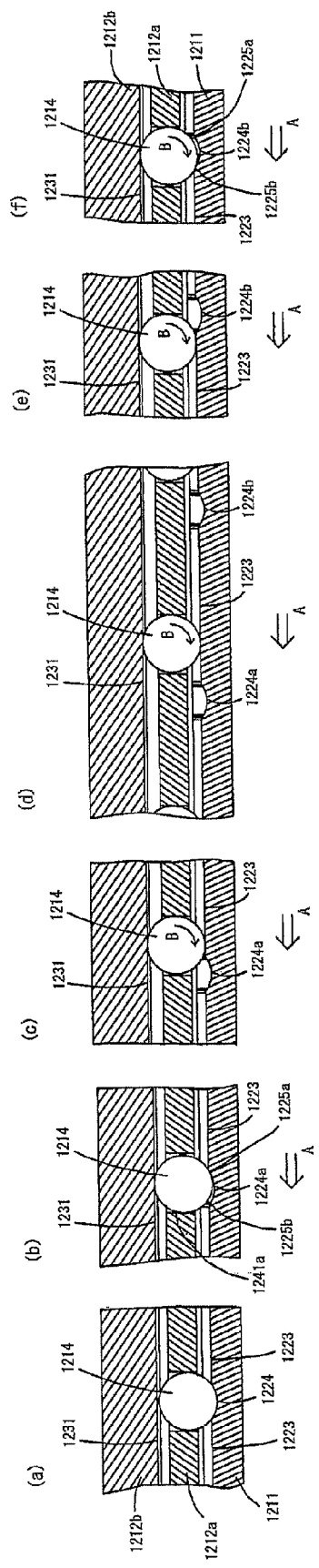
FIG. 11 shows partial cross-sectional views along the circumferential direction, which indicate a motion of the torque limiter.

FIG. 11(*a*) show one situation of the torque limiter 1210 when the grinder 1 is not working. In FIG. 11(*a*), the ball 1214 is positioned on the second cam groove 1224*a*, and the top of the ball 1214 is not contacted with the third cam groove 1231 of the pressing force transmission member 1212*b*. In this case, as shown in FIG. 7, the biasing spring 1216 biases and presses the pressing force transmission member 1212*b* via the thrust bearing 1218, thereby the pressing force transmission member 1212*b* and the top surface of the cushion member 1215 are contact with each other, and further the bottom surface of the cushion member 1215 and the rotation transmission member 1212*a* are contact with each other. Further, the rotation transmission member 1212*a* is supported by the supporting ball 1217 and is not contacted with the second bevel gear 1211. Further, a length of the second cam groove 1224 is defined such that the second cam groove 1224 regulates a free movement of the ball 1214 in the rotational direction of the second bevel gear 1224, when the grinder 1 is not working.

FIG. 11(*b*) shows another situation of the torque limiter 1210, when the rotational output of the motor 100 is transmitted to the spindle 1213. The rotational output of the motor 100 is transmitted to the second bevel gear 1211 thereby the second bevel gear rotates in a direction indicated by the arrow A. Due to the rotation of the second bevel gear 1211, the ball 1214 moves to the incline groove 1225*a* of the second bevel gear 1211, and contacts with the third cam groove 1231 of the pressing force transmission member 1212*b* and a wall surface 1241*a* in the ball holding hole 1241 of the rotation transmission member 1212*a*. In this way, since the biasing force of the biasing spring 1216 is transmitted to the ball 1214 via the pressing force transmission member 1212*b*, the ball 1214 is clamped by the incline groove 1225*a* and the wall surface 1241*a* and thereby the ball 1214 transmits the rotation of the second bevel gear 1211 to the rotation transmission member 1212*a*. Namely, the second bevel gear 1211, the ball 1214 and the rotation transmission member 1212*a* rotate in an integral manner. As a result, the rotation of the second bevel gear 1211 is transmitted to the spindle 1213. Since the grinding disk 2 attached on the spindle 1213 is rotated, a workpiece is worked. The part of the incline groove 1225*a* with which the ball 1214 contacts is a feature corresponding to "a first region" of the invention.

FIG. 11(*c*) shows another situation of the torque limiter 1210, a transmission of rotation from the second bevel gear 1211 to the spindle 1213 is regulated when a torque exceeding a predetermined threshold torque exerts on the spindle 1213. In case that the torque exceeding the predetermined threshold torque exerts on the spindle 1213, in this embodiment, the second bevel gear continues to rotate, however the rotation transmission member 1212*a* stops rotating. Accordingly, the ball 1214 is exerted by a pressing force which presses the ball 1214 from the rotation transmission member 1214. Due to the pressing force, the ball 1214 receives a reaction force from the incline groove 1225*a*. When the sum total of a component of the reaction force of the six balls 1214 in a direction being parallel to the spindle 1213 exceeds the biasing force of the biasing spring 1216, the ball 1214 contacting with the inclined grooves 1225*a* rotates while pushing the pressing force transmission member 1212*b*, and moves to the position where the ball 1214 contacts with the first cam groove 1223. Meanwhile, the pressing force transmission member 1212*b* is biased via the thrust bearing 1218 and is not fixed in the rotational direction, in other word the pressing force transmission member 1212*b* is rotatable freely. Accordingly, the ball 1214 moves to the first cam groove 1223 while rotating. Namely, because of the relative rotation occurred between the second bevel gear 1211 and the pressing force transmission member 1212*b*, the ball 1214 moves from the incline groove 1225*a* to the first cam groove 1223 while the ball 1214 is rolling. In this way, because the ball 1214 is positioned on the first cam groove 1223 which is parallel to the rotational surface of the second bevel gear 1211, the transmission of the rotation is regulated from the second bevel gear 1211 to the rotation transmission member 1212*a* thereby the torque exerted on the spindle 1213 is reduced. Further, since the pressing force transmission member 1212*b* is pushed by the ball 1214, a gap between the pressing force transmission member 1212*a* and the upper surface of the cushion member 1215 is provided.

Each FIG. 11(*d*) and FIG. 11(*e*) shows another situation of the torque limiter 1210 respectively after the ball 1214 has moved to the position where the ball contacts with the first cam groove 1223 and the third cam groove 1231. Because of the rotation of the second bevel gear 1211, the ball 1214 moves toward another second cam groove 1224*b* which is located next to the second cam groove 1224*a* in the circumferential direction while the ball 1214 is rolling. In each FIG. 11(*c*) to FIG. 11(*e*), the biasing force of the biasing spring 1216 is transmitted to the second bevel gear 1211 from the pressing force transmission member 1212*b* via the ball 1214. Namely, the biasing spring 1216 always biases the second bevel gear 1211 and the pressing force transmission member 1212*b* so as to be close to each other.

FIG. 11(*f*) shows another situation of the torque limiter 1210 in which the ball 1214 contacts with the incline groove 1225*b*, when the ball 1214 moves from the first cam groove 1223 to the second cam groove 1224*b*. On the way of the ball 1214 to the second cam groove 1224*b*, the pressing force transmission member 1212*b* biases by the biasing spring 1216 contacts with the cushion member 1215 again. After that, the torque limiter 1210 returns to the situation shown by FIG. 11(*b*) in which the ball 1214 contacts with the incline groove 1225*a* by passing the second cam groove 1214*b*, and then the similar cyclic behavior of the torque limiter 1210 will be repeated.

The rotation of the second bevel gear 1211 is not transmitted to the rotation transmission member 1212*a* in FIG. 11(*c*) to FIG. 11(*f*) respectively. Under these situations, the first cam groove 1223, the second cam groove 1224 and the incline groove 1225*b* of the second bevel gear 1211, and a part of the third cam groove 1231 of the pressing force transmission member 1212*b* except a part of the third cam groove 1231 with which the ball 1214 contacts in FIG. 11(*b*), is a feature corresponding to "a second region" of the invention.

According to the second embodiment described above, since the thrust bearing 1218 is provided, the pressing force transmission member 1212*b* biased by the biasing spring 1216 is rotatable thereby the relative rotation between the second bevel gear 1211 and the pressing force transmission member 1212*b* is occurred.

Further, according to the second embodiment, because the ball 1214 moves while rolling due to the relative rotation of the second bevel gear 1212 and the pressing force transmission member 1212*b*, the ball 1214 can move smoothly. Therefore, the torque limiter 1210 works smoothly. Further, in comparison with a composition in which the ball 1214 moves while sliding against the friction force, the degradation or the heat generation of the ball 1214 by the friction force is reduced.

Further, according to the second embodiment, the biasing spring 1216 always biases the second bevel gear 1211 and the pressing force transmission member 1212b so as to be close to each other. Therefore, when the rotation of the second bevel gear 1211 is not transmitted to the pressing force transmission member 1212b, the second bevel gear 1211 is regulated to rotate while tilting against the spindle 1213.

Further, according to the second embodiment, the length of the second cam groove 1224 in the circumferential direction is defined such that the second cam groove 1224 regulates the free movement of the ball 1214 in the rotational direction of the second bevel gear 1211, when the grinder 1 is not working. In case that the free movement of the ball 1214 in the rotational direction of the second bevel gear 1211 may not be regulated, when the grinder 1 starts or stops driving, a rotation differences between the second bevel gear 1211 and the pressing force transmission member 1212b may be occurred by the movement of the ball 1214. Due to the rotation differences, an inadvertent torque may be exerted on the spindle 1213 or a failure of the driving of the torque limiter 1210 may be occurred when the grinder 1 starts or stops driving. However, according to this embodiment, because the length of the second cam groove 1224 is defined such that the second cam groove 1224 regulates the free movement of the ball 1214 in the rotational direction of the second bevel gear 1211 when the grinder is not working, the inadvertent torque is not exerted and the failure of the driving of the torque limiter 1210 is not occurred.

Further, according to the second embodiment, the rotation transmission member 1212a includes the ball holding hole 1241 which holds the balls 1214, therefore the rotation transmission member 1212a has a function for transmitting the rotation of the second bevel gear 1211 to the spindle 1213, as well as for keeping the interval of the balls 1214. Accordingly, another interval keeping member for keeping the interval of the balls 1214 is not necessary, therefore the number of the components of the torque limiter 1210 is reduced.

Further, according to the second embodiment, because the cushion member 1215 is made of resin, an impact power generated when the rotation transmission member 1212a and the pressing force transmission member 1212b crash into the cushion member 1215 is absorbed. Further, in a state that the ball 1214 is positioned on the second cam groove 1214b, the ball 1214 does not contact with the pressing force transmission member 1212b provided with the third cam groove 1231, thereby the impact power is regulated to transmit from the pressing force transmission member 1212b to the second bevel gear 1211 via the ball 1214.

Further, according to the second embodiment, the first cam groove 1223, the second cam groove 1224 and the incline groove 1225 are disposed on the surface of the second bevel gear 1211 opposed from the side where the grinding disk 2 is attached. Therefore, components of the torque limiter 1210 such as the rotation transmission member 1212a, the pressing force transmission member 1212b, the ball 1214 and the cushion member 1215 and so on, which are disposed to oppose to the first cam groove 1223, the second cam groove 1224 and the incline groove 1225, are disposed on the surface opposed to the side where the grinding disk 2 is attached with respect to the second bevel gear 1211. Therefore, a length of a part of the spindle 1213 protruding in a direction from the second bevel gear 1211 toward the grinding disk 2 attached portion is shortened, thereby the grinder 1 is downsized. Furthermore, since the gear teeth are formed on the edge part of the second bevel gear 1211, the recess 1220 is formed at a central part of the second bevel gear 1211. By arranging components of the torque limiter 1210 such as the rotation transmission member 1212a, the pressing force transmission member 1212b, the ball 214, the cushion member 1215 and so on at the recess 1220, each components are rationally arranged, thereby the torque limiter 1210 is downsized. As a result, the grinder 1 is downsized.

Further, according to the second embodiment, the gear portion 1222 is formed at an opposite side from a side to which the grinding disk 2 is attached with respect to the longitudinal direction of the spindle 1213. Therefore, a length of the spindle 1213 protruding from the second bevel gear 1211 is shortened, and as a result, the grinder 1 is downsized. Further, since the gear portion 1222, the first cam groove 1223, the second cam groove 1224 and the incline groove 1225 are respectively arranged on the opposite side of the second bevel gear 1211 from where the grinding disk 2 is attached, the components of the torque limiter 1210 is rationally arranged. Therefore, the grinder 1 is further downsized.

In the second embodiment described above, the incline groove 1225 inclining the rotational surface of the second bevel gear 1211 is disposed on the second bevel gear 1211, however it is not limited to this composition. For example, in case that a depth difference between the first cam groove 1223 and the second cam groove 1224 is shorter than the radius of the ball 1214, the incline groove 1225 may be disposed as a perpendicular groove including a perpendicular surface which perpendicular to the rotational surface.

In the embodiments described above, the biasing spring 216, 1216 always bias the flange 212 or the pressing force transmission member 1212b, however at least in case the rotation of the second bevel gear 211, 1211 is transmitted to the flange 212 or the pressing force transmission member 1212b, the biasing force may be provided.

In the embodiments described above, the second bevel gear 211, 1211 engages with the first bevel gear 200 thereby the rotational output of the motor 100 is transmitted, however another rotational member as "a driving rotational member" other than the second bevel gear may be provided. Namely, the rotation of the second bevel gear may be adapted to be transmitted to the rotational member as "a driving rotational member".

In the embodiments described above, the length of the second cam groove 224, 1224 in the circumferential direction is defined such that the free movement of the ball 214, 1214 in the rotational direction of the second bevel gear 211, 1211 is regulated, however the length of the second cam groove 224, 1224 is not limited to regulate the free movement of the ball 214, 1214.

In the embodiments described above, the incline groove 225, 1225, 233 includes an incline surface which inclines the rotational surface of the second bevel gear 211, 1211 of the flange 212, however the incline surface is not limited to incline against the rotational surface with a predetermined angle, but may be formed as an arc-like surface. Further, the incline groove may be provided with a plurality of incline surfaces which incline against the rotational surface with each angle respectively.

In the embodiments described above, the torque limiter 210, 1210 including six balls 214, 1214 respectively are explained, however the number of the ball is not limited to six but more than three to make a plane. Further, the roll member is not limited to the ball, the roll member may be provided with a roller such as a cylinder shaped member, a circular cone shaped member or a circular truncated cone shaped member and so on.

In the embodiments described above, for convenience of explanation, the longitudinal direction of the spindle 213, 1213 fits to the gravity direction such that the second bevel gear 211, 1211 is located lower in the gravity direction, however the position of the ball 214, 1213 is different from the explanation described above according to the situation for utilizing the grinder 1. For example, in a state that the spindle 213, 1213 is put upside down, when the grinder 1 is not working, the ball 214, 1214 does not contacts with the second bevel gear 211, 1211. Namely, based on the gravity direction and the situation for utilizing the grinder 1, the contact relation between the ball 214, 1214 and the other member and the contact relation between the ball retainer 215, the cushion member 1215 and the other member may differ from the embodiments described above.

Further, in the embodiments described above, it is explained by utilizing the grinder 1 in which the spindle 213, 1213 perpendicular to the rotational shaft 101, however it is not limited to these composition in which theses axes perpendicular to each other.

In the embodiments described above, it is explained by utilizing the grinder 1 including the torque limiter, however this invention may be apply to a power tool except grinder, which actuates a rotational operation, for example, it is possible to apply this invention to a hammer drill or a circular sawing machine and so on.

DESCRIPTION OF NUMERALS 1 grinder
2 grinding disk
10 main housing
20 gear housing
21 coil spring engaging portion
30 wheel cover
40 rear cover
100 motor
101 rotational shaft
200 first bevel gear
210 torque limiter
211 second bevel gear
212 flange
213 spindle
214 ball
215 ball retainer
216 biasing spring
220 recess
221 through-hole
222 gear portion
223 first cam groove
224 second cam groove
225 incline groove
230 through-hole
231 third cam groove
232 forth cam groove
233 incline groove
234 engaging pin
235 engaging recess
240 through-hole
241 ball holding hole
250 disc spring
251 plain washer
252 nut
260 ball bearing
270 locking member
271 locking pin
272 press cap
273 coil spring
274 flange
280 engaging groove
281 inner flange
282 outer flange
300 electrical wiring portion
301 power code
302 switch
1210 torque limiter
1211 second bevel gear
1212a rotation transmission member
1212b pressing force transmission member
1213 spindle
1214 ball
1215 cushion member
1216 biasing spring
1217 supporting ball
1218 thrust bearing
1220 recess
1221 through-hole
1222 gear portion
1223 first cam groove
1224 second cam groove
1225 incline groove
1226 supporting groove
1231 third cam groove
1236 cushion member holding portion
1241 ball holding hole

What is claimed is:

1. A power tool which is adapted to actuate a tool being attachable to the power tool, comprising:
a motor; and
a torque limiter which is disposed between the motor and the tool, the torque limiter including a driving rotational member; a driven rotational member including a rotational shaft, the driven rotational member to which a rotation of the driving rotational member is transmitted; and a plurality of roll members which is disposed between the driving rotational member and the driven rotational member,
wherein the torque limiter is adapted to regulate a transmission of the rotation from the driving rotational member to the driven rotational member in a state that a torque exerted on the rotational shaft exceeds the predetermined threshold,
wherein each roll member is movable between a first region where the roll member is located to transmit the rotation to the driven rotational member and a second region where the roll member is located to regulate the transmission of the rotation to the driven rotational member,
wherein the roll member transmits the rotation to the driven rotational member in a state that the roll member is located at the first region by rotating integrally with the driving rotational member and the driven rotational member in a circumferential direction of the rotational shaft,
wherein in a state that the torque exerted on the rotational shaft exceeds the predetermined threshold, the driving rotational member and the driven rotational member cause a relative rotation between the driving rotational member and the driven rotational member, and the roll member is moved from the first region to the second region while rolling caused by the relative rotation,
wherein the transmission of the rotation to the driven rotational member is regulated in a state that the roll member is located at the second region, wherein the torque limiter includes a biasing member which biases the driving rotational member and the driven rotational member to be close to each other, wherein the driving rotational member includes a first groove, a second groove which is deeper than the first groove and a driving incline groove which includes an incline surface inclining against a rotating surface of the driving rotational member, the first groove, the second groove and the driving incline groove being respectively contactable with the roll member, and wherein the first groove and the second groove are connected via the driving incline groove such that the first groove, the second groove and the driving incline groove are disposed in a continuous manner in a circumferential direction of the driving rotational member, wherein the driven rotational member includes a third groove corresponding to the first groove, a fourth groove corresponding to the second groove and being deeper than the third groove and a driven incline groove which includes an incline surface inclining against a rotating surface of the driven rotational member, the third groove, the fourth groove and the driven incline groove being respectively contactable with the roll member, and wherein the third groove and the fourth groove are connected via the driven incline groove such that the third groove, the fourth groove and the driven incline groove are disposed in a continuous manner in a circumferential direction of the driven rotational member, wherein a first part defined by a predetermined part of the driving incline groove and a second part defined by a predetermined part of the driven incline groove provide the first region, and wherein the first groove, the second groove, a part except the first part of the driving incline groove and the third groove, the fourth groove, a part except the second part of the driven incline groove provide the second region.

2. The power tool according to claim 1, wherein the biasing member always biases the driving rotational member and the driven rotational member to be close to each other.

3. The power tool according to claim 1, wherein the torque limiter includes a cushion member which is disposed between the driving rotational member and the driven rotational member, wherein a thickness of the cushion member is defined such that the cushion member contacts with one of the driving rotational member and the driven rotational member in a state that the roll member contacts with the first groove, and contacts with both of the driving rotational member and the driven rotational member in a state that the roll member contacts with the second groove.

4. The power tool according to claim 3, wherein the second groove is disposed at a plurality of areas which are located at regular intervals in the circumferential direction of the driving rotational member, said plurality of areas corresponding to said plurality of roll members respectively, wherein the cushion member includes a plurality of holding portions which hold said plurality of roll members respectively such that said plurality of roll members are held at regular intervals.

5. The power tool according to claim 1, wherein the torque limiter includes a retainer which is disposed between the driving rotational member and the driven rotational member, the retainer retaining said plurality of roll members such that said plurality of roll members are located at regular intervals in a rotational direction of the rotational shaft.

6. The power tool according to claim 1, wherein a length of the second groove in a circumferential direction is defined such that the roll member is regulated to move on the second groove in the rotational direction.

7. The power tool according to claim 1, wherein the driving rotational member includes a gear portion to which a rotational output of a rotational driving mechanism is transmitted.

8. A power tool which is adapted to actuate a tool being attachable to the power tool, comprising:

a motor; and a torque limiter which is disposed between the motor and the tool, the torque limiter including a driving rotational member; a driven rotational member including a rotational shaft, the driven rotational member to which a rotation of the driving rotational member is transmitted; and a plurality of roll members which is disposed between the driving rotational member and the driven rotational member, wherein the torque limiter is adapted to regulate a transmission of the rotation from the driving rotational member to the driven rotational member in a state that a torque exerted on the rotational shaft exceeds the predetermined threshold, wherein each roll member is movable between a first region where the roll member is located to transmit the rotation to the driven rotational member and a second region where the roll member is located to regulate the transmission of the rotation to the driven rotational member, wherein the roll member transmits the rotation to the driven rotational member in a state that the roll member is located at the first region by rotating integrally with the driving rotational member and the driven rotational member in a circumferential direction of the rotational shaft, wherein in a state that the torque exerted on the rotational shaft exceeds the predetermined threshold, the driving rotational member and the driven rotational member cause a relative rotation between the driving rotational member and the driven rotational member, and the roll member is moved from the first region to the second region while rolling caused by the relative rotation, wherein the transmission of the rotation to the driven rotational member is regulated in a state that the roll member is located at the second region, wherein the torque limier includes a biasing member which biases the driving rotational member and the roll member to be close to each other, and a thrust bearing which is disposed between the biasing member and the driven member, wherein the driven rotational member includes a pressing member which presses the roll member against the driving rotational member by transmitting a biasing force of the biasing member exerted via the thrust bearing to the roll member, and a transmission member which transmits the rotation to the rotational shaft, wherein the driving rotational member includes a first groove, a second groove which is deeper than the first groove and a connect groove which includes a cross surface crossing the a rotating surface of the driving rotational member, the first groove, the second groove and the connect groove being respectively contactable with the roll member, and wherein the first groove and the second groove are connected via the connect groove such that the first groove, the second groove and the connect groove are disposed in a continuous manner in a circumferential direction of the driving rotational member, wherein a part of the connect groove provides the first region, and wherein the first groove, the second groove and the other part of the part of the connect groove provide the second region.

9. The power tool according to claim 8, wherein the torque limiter includes a cushion member which is disposed between the pressing member and the transmission member of the driven rotational member.

* * * * *